UNITED STATES PATENT OFFICE 2,607,777

N-ALKYL PIPERIDYL ALKYL ESTERS OF DIPHENYL ACETIC ACID AND 9-FLUORENYL CARBOXYLIC ACID

Robert R. Burtner, Skokie, and John M. Brown, Chicago, Ill., assignors to G. D. Searle & Co., Skokie, Ill., a corporation of Illinois No Drawing. Application April 10, 1947, Serial No. 740,712

9 Claims. (Cl. 260—294.3)

This invention relates to piperidylalkyl esters of diarylacetic acids. In particular it relates to piperidylalkyl esters of aromatic substituted acetic acids having the general formula:

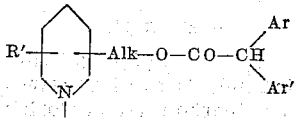

wherein the nitrogen-containing ring is completely saturated; Alk represents a lower alkylene radical such as methylene, ethylene, propylene, trimethylene and the butylene radicals; Ar and Ar' represent simply aryl radicals such as phenyl, tolyl, halophenyl, anisyl, naphthyl, xenyl and the like; R represents a lower alkyl radical such as methyl, ethyl, propyl or butyl; and R' represents hydrogen or lower alkyl. Ar and Ar' together can form an arylene radical such as the o-biphenylene radical, which together with the CH grouping comprises a 9-fluorenyl radical. Other arylene radicals which are within the purview of this invention include those which together with the CH group, make up 10-xanthyl, 10-thioxanthyl and 9,10-dihydro-10-anthryl radicals. As used herein, the term diaryl includes two aryl radicals or one arylene radical.

The following substances are illustrative of our invention. They are prepared by treatment of the N-alkylpiperidylalkanols with diarylacetyl halides in inert media.

(A) 2-(6,N-dimethyl-2-piperidyl)ethyl diphenylacetate, which has the formula

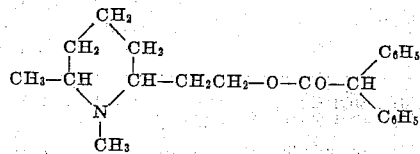

(B) 3-(N-ethyl-alpha-piperidyl)propyl phenyltolylacetate, having the formula

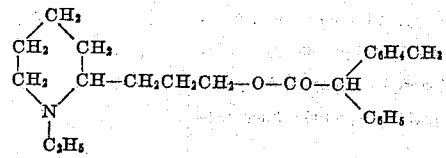

(C) (N-methyl-gamma-piperidyl)methyl xanthene-10-carboxylate, of the formula

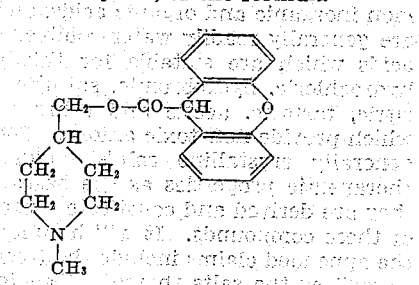

(D) (N-ethyl-beta-piperidyl)methyl thioxanthene-10-carboxylate, which has the formula

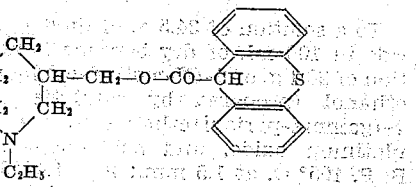

(E) 2-(N-ethyl-alpha-methyl-beta-piperidyl)-ethyl 9,10-dihydroanthracene-10-carboxylate, of the formula

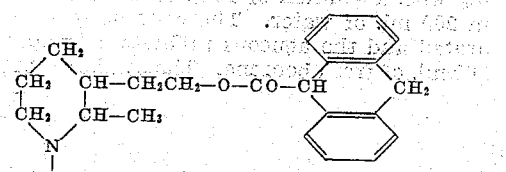

(F) 1-(N-propyl-gamma-piperidyl)-2-propyl xenyl-phenylacetate, of the formula

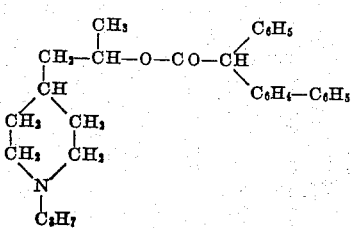

(G) 1 - (N - methyl - gamma - piperidyl) - 2-propyl chlorophenylanisylacetate, having the formula

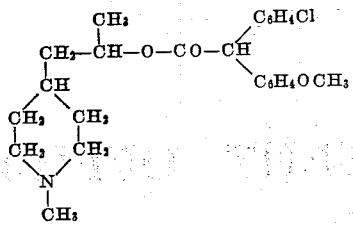

The compounds which comprise this invention are useful in therapeutics, particularly as antispasmodic agents. The esters are prepared by esterifying an N-alkylpiperidylalkanol with a diarylacetic acid or preferably with a diarylacetyl chloride. The N-alkyl-piperidylalkanols are synthesized from the corresponding pyridylalkanols. The latter are hydrogenated, preferably in the presence of platinum oxide catalyst, to piperidylalkanols, which are then alkylated by any of a variety of alkylation procedures, such as treatment with an alkyl halide, reduction in the presence of an aliphatic aldehyde and the like.

The amino esters readily form salts with common inorganic and organic acids, and these salts are generally readily water-soluble. Among the acids which are suitable for this purpose are hydrochloric, hydrobromic, sulfuric, phosphoric, citric, tartaric, acetic and other similar acids which provide non-toxic anions. These salts are generally crystalline solids having the same therapeutic properties as the bases from which they are derived and constitute a preferred form of these compounds. It will be understood that the appended claims include the free basic esters as well as the salts thereof. The following examples are intended merely to illustrate our invention and do not limit it in spirit or in scope.

Example 1

To a solution of 34.5 g. of diphenylacetyl chloride in 100 ml. of dry benzene is added a solution of 20.1 g. of 2-(N-methyl-gamma-piperidyl)-ethanol (prepared by catalytic reduction of 2-(gamma-pyridyl)ethanol in the presence of platinum oxide, and subsequent methylation; B. P. 105° C. at 1.5 mm.; $n_D^{26}$ 1.4746) in 100 ml. of benzene. The resulting mixture is heated on the steam bath for five hours. Following the heating period, 100 ml. more of benzene is added and the mixture is made alkaline by shaking with a solution of 16 g. of sodium hydroxide in 200 ml. of water. The benzene layer is separated and the aqueous raffinate extracted with 200 ml. of fresh benzene. The combined extracts are washed with water, dried over sodium sulfate and filtered. Subsequent removal of solvent on the water bath at 60° C. under water pump vacuum leaves a dark oily residue.

The residue is taken up in 510 ml. of dry ether and treated with charcoal, and a small amount of insoluble material is filtered out. Upon addition of the theoretical amount of absolute alcoholic hydrochloric acid, the hydrochloride is precipitated as well-defined white crystals. The crystals are washed by decantation with dry ether, recovered on a Büchner funnel, washed additionally thereon and dried in vacuo over sodium hydroxide; M. P. 168-170° C. Upon recrystallization from isopropanol and ethyl acetate (1:1), treating with charcoal in process, there are obtained colorless crystals of 2-(N-methyl-gamma-piperidyl)ethyl diphenylacetate hydrochloride of M. P. 171-172° C. The free ester has the formula

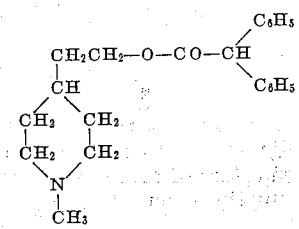

Example 2

A mixture of 22.4 g. of 9,10-dihydroanthracene-9-carboxylic acid, 30 g. of thionyl chloride and 70 ml. of dry carbon tetrachloride is refluxed for ½ hour. Solvent and excess thionyl chloride are removed in vacuo at 60° C. The residue, 9,10-dihydroanthracene-9-carboxylic acid chloride, is dissolved in 50 ml. of dry benzene. To this solution is added 14 g. of 3-(N-ethyl-gamma-piperidyl)propanol in 50 ml. of benzene and the resulting mixture is refluxed for 3½ hours. The reaction mixture is cooled, made alkaline with excess dilute sodium hydroxide and the organic layer separated. The aqueous layer is extracted with benzene and the extract is combined with the organic layer. The resulting benzene solution is washed with water, dried and evaporated, yielding oily 3-(N-ethyl-gamma-piperidyl)propyl 9,10-dihydroanthracene-9-carboxylate. The hydrochloride of this ester is prepared by treating the dry ethereal solution of the ester with an equivalent of absolute alcoholic hydrogen chloride.

Example 3

By following the methods of the above examples there may be prepared the following esters:

| Ester | M. p. of Hydrochloride, °C. | Percent Nitrogen | |
|---|---|---|---|
| | | Calcd. | Found |
| 2-(N-Methyl-alpha-piperidyl)ethyl diphenylacetate | 152-153 | | |
| 2-(N-Methyl-alpha-piperidyl)ethyl fluorene-9-carboxylate | | 3.77 | 3.34 |
| 1-(N-Methyl-alpha-piperidyl)-2-propyl fluorene-9-carboxylate | | 3.63 | 3.43 |
| 1-(N-Methyl-alpha-piperidyl)-2-propyl diphenylacetate | | 3.61 | 3.76 |
| 3-(N-Methyl-alpha-piperidyl)-1-propyl diphenylacetate | 103-105 | | |
| 3-(N-Methyl-alpha-piperidyl)-1-propyl fluorene-9-carboxylate | | 3.63 | 3.19 |
| 2-(N-Methyl-gamma-piperidyl)ethyl fluorene-9-carboxylate | | 3.77 | 3.34 |
| 3-(N-Methyl-gamma-piperidyl)-1-propyl diphenylacetate | 110-111 | | |
| 3-(N-Methyl-gamma-piperidyl)-1-propyl fluorene-9-carboxylate | | 3.63 | 3.38 |

We claim:
1. A member of the group consisting of a basic ester and acid addition salts thereof, said basic ester having the formula

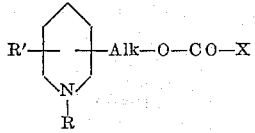

wherein the nitrogen-containing ring is completely saturated, R' is a member of the group consisting of hydrogen and lower alkyl radicals, R is a lower alkyl radical, Alk is a lower alkylene radical, and X is a member of the group consisting of 9-fluorenyl and diphenylmethyl radicals.

2. An acid addition salt of a basic ester of the formula

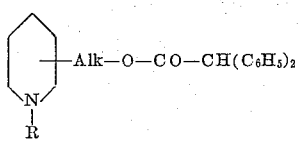

wherein the nitrogen-containing ring is completely saturated, R is a lower alkyl radical, and Alk is a lower alkylene radical.

3. An acid addition salt of a basic ester of the formula

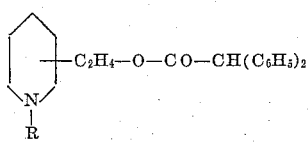

wherein the nitrogen-containing ring is completely saturated and R is a lower alkyl radical.

4. An acid addition salt of a basic ester of the formula

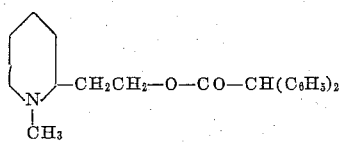

wherein the nitrogen-containing ring is completely saturated.

5. The hydrochloride of the basic ester of claim 4.

6. An acid addition salt of a basic ester of the formula

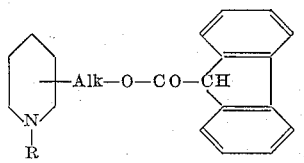

wherein the nitrogen-containing ring is completely saturated, R is a lower alkyl radical and Alk is a lower alkylene radical.

7. An acid addition salt of a basic ester of the formula

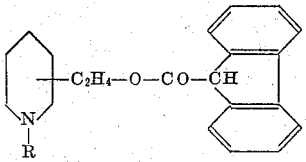

wherein the nitrogen-containing ring is completely saturated and R is a lower alkyl radical.

8. An acid addition salt of a basic ester of the formula

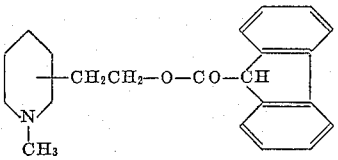

wherein the nitrogen-containing ring is completely saturated.

9. The hydrochloride of the basic ester of claim 8.

ROBERT R. BURTNER.
JOHN M. BROWN.

REFERENCES CITED

The following references are of record in the file of this patent:

UNITED STATES PATENTS

| Number | Name | Date |
|---|---|---|
| 2,079,962 | Miescher | May 11, 1937 |
| 2,143,491 | Miescher | Jan. 10, 1939 |
| 2,221,828 | Wolfes | Nov. 19, 1940 |
| 2,229,533 | Walter | Jan. 21, 1941 |
| 2,377,040 | Rieveschl | May 29, 1945 |
| 2,387,879 | Burtner | Oct. 30, 1945 |

OTHER REFERENCES

Burtner: J. Amer. Chem. Soc. (1943), pp. 262–267.

Blicke: J. Amer. Chem. Soc. October 1943, pp. 1967–1970.

Sandborn et al.: Chem. Abst., vol. 22 (1928), p. 963.

Marvel et al.: Chem. Abst., vol. 23 (1929), p. 1902.

Winterfield et al.: Chem. Abst., vol. 29 (1935), p. 7331.

Robe et al.: Chem. Abst., vol. 32 (1938), pp. 8420–8421.

Renshaw et al.: Chem. Abst., vol. 33 (1939), pp. 3379–3380.

Tullock et al.: Chem. Abst., vol. 33 (1939), p. 4250.

Prelog et al.: Chem. Abst., vol. 33 (1939), p. 7797.

Prelog et al.: Chem. Abst., vol. 38 (1944), p. 6289.